(12) United States Patent
Horovitz et al.

(10) Patent No.: US 9,747,450 B2
(45) Date of Patent: Aug. 29, 2017

(54) ATTESTATION USING A COMBINED MEASUREMENT AND ITS CONSTITUENT MEASUREMENTS

(71) Applicant: Facebook, Inc., Menlo Park, CA (US)

(72) Inventors: Oded Horovitz, Palo Alto, CA (US); Sahil Rihan, Menlo Park, CA (US); Stephen A. Weis, San Francisco, CA (US); Daniel Arai, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 170 days.

(21) Appl. No.: 14/618,099

(22) Filed: Feb. 10, 2015

(65) Prior Publication Data
US 2015/0227744 A1 Aug. 13, 2015

Related U.S. Application Data

(60) Provisional application No. 61/938,070, filed on Feb. 10, 2014.

(51) Int. Cl.
*G06F 21/57* (2013.01)

(52) U.S. Cl.
CPC ........ *G06F 21/57* (2013.01); *G06F 2221/034* (2013.01)

(58) Field of Classification Search
CPC .......................... G06F 21/57; G06F 2221/034
See application file for complete search history.

(56) References Cited

U.S. PATENT DOCUMENTS

| | | |
|---|---|---|
| 5,875,472 A | 2/1999 | Bauman et al. |
| 6,026,475 A | 2/2000 | Woodman |
| 6,044,478 A | 3/2000 | Green et al. |
| 6,129,458 A | 10/2000 | Waters et al. |
| 6,223,256 B1 | 4/2001 | Gaither et al. |
| 6,389,442 B1 | 5/2002 | Yin et al. |
| 6,697,927 B2 | 2/2004 | Bonola et al. |

(Continued)

OTHER PUBLICATIONS

Notice of Allowance mailed Jun. 27, 2016, for U.S. Appl. No. 14/479,239 of Waldspurger, C. et al., filed Sep. 5, 2014.

(Continued)

*Primary Examiner* — Linglan Edwards
(74) *Attorney, Agent, or Firm* — Perkins Coie LLP

(57) ABSTRACT

An attestation system for asserting and verifying assertions of a known-good state of a computer system is provided. The attestation system allows a challenger and a prover to conduct an attestation so that the challenger can verify an assertion of the prover. To conduct the attestation, the prover sends, as an assertion of its state, a combined measurement of resources along with a constituent measurement of each resource to the challenger. The challenger verifies the assertion by verifying that the asserted constituent measurements represent known-good measurements and verifying that the asserted combined measurement can be generated from the asserted constituent measurements. To verify the asserted constituent measurements, the challenger determines whether each asserted constituent measurement for a resource is a known-good measurement for that resource. To verify the asserted combined measurement, the challenger generates a combined measurement from the asserted constituent measurements received from the prover.

20 Claims, 7 Drawing Sheets

(56) References Cited

U.S. PATENT DOCUMENTS

| | | | |
|---|---|---|---|
| 6,957,304 | B2 | 10/2005 | Wilkerson et al. |
| 6,970,960 | B1 | 11/2005 | Sarfati et al. |
| 7,266,661 | B2 | 9/2007 | Walmsley et al. |
| 7,434,000 | B1 | 10/2008 | Barreh et al. |
| 7,577,851 | B2 | 8/2009 | Inamura et al. |
| 7,657,756 | B2 | 2/2010 | Hall et al. |
| 7,671,864 | B2 | 3/2010 | Román et al. |
| 7,774,622 | B2 | 8/2010 | Mitra et al. |
| 8,037,250 | B1 | 10/2011 | Barreh et al. |
| 8,135,962 | B2 | 3/2012 | Strongin et al. |
| 8,266,676 | B2* | 9/2012 | Hardjono ............ H04L 63/0823 709/229 |
| 8,352,718 | B1 | 1/2013 | Rao et al. |
| 8,549,288 | B2* | 10/2013 | Bade ................ G06F 21/57 173/155 |
| 8,615,665 | B2 | 12/2013 | Fitton et al. |
| 8,726,364 | B2 | 5/2014 | Smith et al. |
| 8,738,932 | B2 | 5/2014 | Lee et al. |
| 8,782,433 | B2 | 7/2014 | Kaabouch et al. |
| 8,812,796 | B2 | 8/2014 | Gray et al. |
| 8,886,959 | B2 | 11/2014 | Tamiya et al. |
| 8,904,477 | B2 | 12/2014 | Walker et al. |
| 8,924,743 | B2 | 12/2014 | Wolfe et al. |
| 8,949,797 | B2 | 2/2015 | Christodorescu et al. |
| 8,990,582 | B2 | 3/2015 | McGrew et al. |
| 9,164,924 | B2 | 10/2015 | Horovitz et al. |
| 9,361,449 | B2* | 6/2016 | Sugano ................ G06F 21/57 |
| 9,477,603 | B2 | 10/2016 | Waldspurger et al. |
| 9,639,482 | B2 | 5/2017 | Weis et al. |
| 2002/0004860 | A1 | 1/2002 | Roman et al. |
| 2002/0116584 | A1 | 8/2002 | Wilkerson et al. |
| 2002/0116595 | A1 | 8/2002 | Morton et al. |
| 2002/0138700 | A1 | 9/2002 | Holmberg et al. |
| 2003/0033480 | A1 | 2/2003 | Jeremiassen et al. |
| 2003/0065892 | A1 | 4/2003 | Bonola et al. |
| 2003/0188178 | A1 | 10/2003 | Strongin et al. |
| 2003/0236947 | A1 | 12/2003 | Yamazaki et al. |
| 2004/0111639 | A1 | 6/2004 | Schwartz et al. |
| 2006/0015748 | A1 | 1/2006 | Goto et al. |
| 2006/0020941 | A1 | 1/2006 | Inamura et al. |
| 2006/0080553 | A1 | 4/2006 | Hall et al. |
| 2006/0179228 | A1 | 8/2006 | Thompson et al. |
| 2007/0239938 | A1 | 10/2007 | Pong et al. |
| 2007/0288228 | A1 | 12/2007 | Taillefer et al. |
| 2008/0010413 | A1 | 1/2008 | Kailas et al. |
| 2008/0022160 | A1 | 1/2008 | Chakraborty et al. |
| 2008/0109660 | A1 | 5/2008 | Mitra et al. |
| 2008/0229118 | A1 | 9/2008 | Kasako et al. |
| 2008/0235804 | A1* | 9/2008 | Bade ................ G06F 21/57 726/26 |
| 2009/0094601 | A1 | 4/2009 | Vstovskiy |
| 2009/0254895 | A1 | 10/2009 | Chen et al. |
| 2009/0328195 | A1 | 12/2009 | Smith et al. |
| 2010/0005300 | A1 | 1/2010 | Klotsche et al. |
| 2010/0062844 | A1* | 3/2010 | Crowder, Jr. .......... G06F 21/57 463/29 |
| 2010/0064144 | A1 | 3/2010 | Kaabouch et al. |
| 2010/0115620 | A1 | 5/2010 | Alme et al. |
| 2010/0268692 | A1* | 10/2010 | Resch ................ G06F 11/1044 707/687 |
| 2010/0281223 | A1 | 11/2010 | Wolfe et al. |
| 2010/0281273 | A1 | 11/2010 | Lee et al. |
| 2010/0287385 | A1 | 11/2010 | Conte et al. |
| 2011/0022818 | A1 | 1/2011 | Kegel et al. |
| 2011/0040940 | A1 | 2/2011 | Wells et al. |
| 2011/0047362 | A1 | 2/2011 | Eichenberger et al. |
| 2011/0113260 | A1 | 5/2011 | Ma et al. |
| 2011/0167278 | A1 | 7/2011 | Goto et al. |
| 2011/0258610 | A1 | 10/2011 | Aaraj et al. |
| 2011/0314468 | A1 | 12/2011 | Zhou et al. |
| 2012/0124296 | A1 | 5/2012 | Bryant et al. |
| 2012/0317569 | A1 | 12/2012 | Payne, Jr. |
| 2013/0067245 | A1 | 3/2013 | Horovitz et al. |
| 2013/0090091 | A1* | 4/2013 | Weng ................ H04W 12/06 455/411 |
| 2013/0125244 | A1* | 5/2013 | Sugano ................ G06F 21/44 726/26 |
| 2013/0159726 | A1 | 6/2013 | McKeen et al. |
| 2013/0191651 | A1 | 7/2013 | Muff et al. |
| 2013/0254494 | A1 | 9/2013 | Oxford et al. |
| 2013/0263121 | A1 | 10/2013 | Franke et al. |
| 2014/0007087 | A1 | 1/2014 | Scott-Nash |
| 2014/0108649 | A1 | 4/2014 | Barton et al. |
| 2014/0173275 | A1 | 6/2014 | Johnson |
| 2014/0201452 | A1 | 7/2014 | Meredith et al. |
| 2015/0067265 | A1 | 3/2015 | Weis et al. |
| 2015/0089152 | A1 | 3/2015 | Busaba |
| 2015/0089153 | A1 | 3/2015 | Busaba |
| 2015/0089154 | A1 | 3/2015 | Busaba |
| 2015/0089155 | A1 | 3/2015 | Busaba |
| 2015/0089159 | A1 | 3/2015 | Busaba |
| 2015/0089502 | A1 | 3/2015 | Weis et al. |
| 2015/0134932 | A1 | 5/2015 | Mcnairy |
| 2015/0149732 | A1 | 5/2015 | Kiperberg et al. |
| 2015/0186295 | A1 | 7/2015 | Long et al. |
| 2015/0269091 | A1 | 9/2015 | Horowitz et al. |
| 2015/0378731 | A1 | 12/2015 | Lai |
| 2016/0224475 | A1 | 8/2016 | Horovitz et al. |

OTHER PUBLICATIONS

Non-Final Office Action mailed Jul. 28, 2016, for U.S. Appl. No. 14/497,111 of Horovitz, O. et al., filed Sep. 25, 2014.

Non-Final Office Action mailed Jul. 27, 2016, for U.S. Appl. No. 14/663,217 of Horovitz, O. et al., filed Mar. 19, 2015.

First Office Action mailed Aug. 2, 2016, for Japanese Patent Application No. 2014-530797, 7 pages.

Deayton, Peter et al., "Set Utilization Based Dynamic Shared Cache Partitioning", Parallel and Distributed Systems (ICPADS), 2011 IEEE 17th International Conference, Dec. 7-9, 2011, pp. 284-291.

Li, Zhiyuan, "Reducing Cache Conflicts by Partitioning and Privatizing Shared Arrays", Parallel Architectures and Compilation Techniques Proceedings, International Conference on 1999, 1999, pp. 183-190.

Rajimwale, Abhishek et al., "Coerced Cache Eviction and Discreet Mode Journaling: Dealing with Misbehaving Disks", IEEE/IFIP 41st International Conference on Dependable Systems & Networks (DSN), Jun. 27-30, 2011, pp. 518-529.

"Intel 64 and IA-32 Architectures Software Developer's Manual, vol. 3 (3A, 3B & 3C): System Programming Guide," Intel Corporation, Dec. 2015, pp. 1-1698. [Part 1].

"Intel 64 and IA-32 Architectures Software Developer's Manual, vol. 3 (3A, 3B & 3C): System Programming Guide," Intel Corporation, Dec. 2015, pp. Jan. 1698. [Part 2].

"Intel 64 and IA-32 Architectures Software Developer's Manual, vol. 3 (3A, 3B & 3C): System Programming Guide," Intel Corporation, Dec. 2015, pp. 1-1698. [Part 3].

"Intel 64 and IA-32 Architectures Software Developer's Manual, vol. 3 (3A, 3B & 3C): System Programming Guide," Intel Corporation, Dec. 2015, pp. 1-1698. [Part 4].

"Intel 64 and IA-32 Architectures Software Developer's Manual, vol. 3 (3A, 3B & 3C): System Programming Guide," Intel Corporation, Dec. 2015, pp. 1-1698. [Part 5].

"Intel 64 and IA-32 Architectures Software Developer's Manual, vol. 3 (3A, 3B & 3C): System Programming Guide," Intel Corporation, Dec. 2015, pp. 1-1698. [Part 6].

"Intel 64 and IA-32 Architectures Software Developer's Manual, vol. 3 (3A, 3B & 3C): System Programming Guide," Intel Corporation, Dec. 2015, pp. 1-1698. [Part 7].

Trusted Computing Group, [retrieved on Nov. 12, 2015], Retrieved from the internet: <http://www.trustedcomputinggroup.org>, 2015, 1 page.

Cache management via page coloring, Wikipedia, [retrieved on Nov. 12, 2015], Retrieved from the Internet: <http://en.Wikipedia.org/wiki/cache_coloring>, Nov. 6, 2015, 2 pages.

(56) References Cited

OTHER PUBLICATIONS

Hardware security module, Wikipedia, [retrieved on Nov. 12, 2015], Retrieved from the Internet: <http://en.wikipedia.org/wiki/hardware_security_module>, Oct. 21, 2015, 5 pages.
Intel® Trusted Execution Technology (Intel® TXT), Software Development Guide, Measured Launch Environment Developer's Guide, Revision 012, Document: 315168-012, [retrieved on Nov. 12, 2015], Retrieved from the internet: <http://download.Intel.com/technology/security/downloads/315168.pdf>, Jul. 2015, pp. 1-169.
Anati Ittai, et al., "Innovative Technology for CPU Based Attestation and Sealing", Proceedings of the Second International Workshop on Hardware and Architectural Support for Security and Privacy (HASP '13), Jun. 2013, pp. 1-7.
Baumann, A., et al., "Shielding Applications from an Untrusted Cloud wth Haven," Proceedings of the 11th USENIX Symposium on Operating Systems Design and Implementation, Oct. 6-8, 2014, pp. 267-283.
Bellard, F., "QEMU, a fast and portable dynamic translator", Proceedings of the USENIX 2005 Annual Technical Conference, FREENIX Track, Apr. 2005, pp. 41-46.
Bochs, "The Cross-Platform IA-32 Emulator" [retrieved on Aug. 26, 2015] Retrieved from the Internet: <http://bochs.sourceforge.net/>, May 3, 2015, 2 pages.
Bugnion, E. et al., "Compiler-directed page coloring for multiprocessors", Proceedings of the Seventh International Conference on Architectural Support for Programming Languages and Operating Systems (ASPLOS VII), ACM, Oct. 1996, 12 pages.
Chen, X. et al., "Overshadow: A Virtualization-Based Approach to Retrofitting Protection in Commodity Operating Systems", Proceedings of the Thirteenth International Conference on Architectural Support for Programming Languages and Operating Systems (ASPLOS '08), ACM, Mar. 1-5, 2008, pp. 2-13.
Chen, X., et al., "Operating System Controlled Processor-Memory Bus Encryption", in Proceedings of Design, Automation and Test in Europe, 2008, (Date'08), IEEE, pp. 1154-1159.
Iyer, Ravi, "COoS: A Framework for Enabling OoS in Shared Caches of CMP Platforms," In Proceedings of the 18th Annual International Conference on Supercomputing (ICS '04), ACM, Jun. 26-Jul. 1, 2004, pp. 257-266.
McKeen, F., et al., "Innovative Instructions and Software Model for Isolated Execution", Proceedings of the Second International Workshop on Hardware and Architectural Support for Security and Privacy (HASP '13), ACM, Jun. 2013, pp. 1-8.
Muller, T. et al., "TRESOR Runs Encryption Securely Outside RAM", in Proceedings of the 20th USENIX Security Symposium [retrieved Nov. 12, 2015] Retrieved from the Internet: <http://www.usenix.org/events/sec11/tech/full_papers/muller.pdf>, Aug. 2011, pp. 1-16.
Peterson, Peter A.H., "Cryptkeeper: Improving Security with Encrypted RAM", in IEEE International Conference on Technologies for Homeland Security (HST 2010), Nov. 2010, pp. 1-7.
Ports, Dan R.K. et al., "Towards application security on untrusted operating systems", Proceedings of the Third Conference on Hot Topics in Security (HOTSEC '08), Jul. 2008, 7 pages.
Rosenblum, M., et al., "Using the SimOS machine simulator to study complex computer systems", ACM Transactions on Modeling and Computer Simulation, vol. 7, Issue 1, Jan. 1997, pp. 78-103.
Vasudevan, A., et al. "CARMA: A Hardware Tamper-Resistant Isolated Execution Environment on Commodity x86 Platforms", in Proceedings of the ACM Symposium on Information,Computer and Communications Security (ASIACCS 2012), May 2012, 5 pages.
Zhang, X. et al. 2009, "Towards practical page coloring-based multicore cache management", Proceedings of the 4th ACM European Conference on Computer Systems (EuroSys '09), ACM, Apr. 1-3, 2009, pp. 89-102.
Advisory Action mailed Aug. 19, 2014, for U.S. Appl. No. 13/614,935 of Horovitz, O. et al., filed Sep. 13, 2015.
Extended European Search Report mailed Aug. 5, 2015, for European Patent Application No. 12831564.5, 7 pages.
Final Office Action mailed Jun. 5, 2014, for U.S. Appl. No. 13/614,935 of Horovitz, O., filed Sep. 13, 2012.
International Search Report and Written Opinion of International Application No. PCT/US12/55210, Jan. 25, 2013, 11 pages.
Non-Final Office Action mailed Feb. 19, 2015, for U.S. Appl. No. 13/614,935 of Horovitz, O., filed Sep. 13, 2012.
Non-Final Office Action mailed Nov. 18, 2013, for U.S. Appl. No. 13/614,935 of Horovitz, O., filed Sep. 13, 2012.
Notice of Allowance mailed Jul. 15, 2015, for U.S. Appl. No. 13/614,935 of Horovitz, O., filed Sep. 13, 2012.
Restriction Requirement mailed Aug. 27, 2013, for U.S. Appl. No. 13/614,935 of Horovitz, O. et al., filed Sep. 13, 2015.
U.S. Appl. No. 13/614,935, of Horovitz, O., et al. filed Sep. 13, 2012.
U.S. Appl. No. 14/479,239 of Horovitz, O. et al., filed Aug. 5, 2014.
U.S. Appl. No. 14/497,111 of Horovitz, O. et al., filed Sep. 25, 2014.
U.S. Appl. No. 14/504,203 of Horovitz, O. et al., filed Oct. 1, 2014.
U.S. Appl. No. 14/663,217 of Horovitz, O. et al., filed Mar. 19, 2015.
U.S. Appl. No. 14/820,428 of Horovitz, O. et al., filed Aug. 6, 2015.
Notice of Allowance mailed Jan. 25, 2017 for U.S. Appl. No. 14/820,428 of Horoivitz, O. et al., filed Aug. 6. 2015.
Final Office Action mailed Dec. 27, 2016, for U.S. Appl. No. 14/497,111 of Horovitz, O. et al., filed Sep. 25, 2014.
Final Office Action mailed Jan. 13, 2017, for U.S. Appl. No. 14/663,217 of Horovitz, O. etal., filed Mar. 19, 2015.
Second Office Action mailed Dec. 6, 2016 for Japanese Patent Application No. 2014-530797, 4 pages.
Non-Final Office Action mailed Oct. 6, 2016, U.S. Appl. No. 14/820,428 of Horovitz, O. filed Aug. 6, 2015.
U.S. Appl. No. 15/274,981 of Waldspurger, C., et al., filed Sep. 23, 2016.
Non-Final Office Action mailed Nov. 30, 2016, for U.S. Appl. No. 14/504,203 of Horovitz, O. et al., filed Oct. 1, 2014.
Final Office Action dated May 18, 2017 for U.S. Appl. No. 14/504,203 of Horovitz, O. et al., filed Oct. 1, 2014.
Non-Final Office Action dated May 26, 2017, for U.S. Appl. No. 14/497,111 of Horovitz, O. et al., filed Sep. 25, 2014.
Notice of Allowance dated Jun. 15, 2017 of U.S. Appl. No. 14/663,217 by Horovitz, O., et al., filed Mar. 19, 2015.

* cited by examiner

ATTESTATION USING A COMBINED MEASUREMENT AND ITS CONSTITUENT MEASUREMENTS

CROSS-REFERENCE TO RELATED APPLICATIONS

This application claims the benefit of U.S. Provisional Patent Application No. 61/938,070 entitled "FLEXIBLE AND SCALABLE ATTESTATION USING DYNAMICALLY COMPUTED WHITELISTS," filed Feb. 10, 2014, which is incorporated herein by reference in its entirety.

BACKGROUND

Computer systems are often targets of attacks by unauthorized individuals, organizations, and states. These attacks may include the installing of malware (i.e., malicious software) onto a computer to compromise (or infect) the software (including firmware) of the computer. For example, malware may be inserted as part of the operating system kernel or may be loaded by an application program. The malware may cause the compromised software to bypass its security measures, reveal its secrets, alter its behavior, deny service to its clients, and so on.

When a computer system interacts with another computer system, each computer system may want to ensure that the other computer system has not been compromised with malware. For example, a client computer system ("client") requesting services of a server computer system ("server") may want to ensure that the operating system and application programs have not been compromised. To ensure that a server has not been compromised (e.g., the programs of the server have not been compromised), a client can request evidence that the server has not been compromised and the server can provide that evidence as an assertion of its state in a process known as "remote attestation." The server typically collects the evidence during its initialization to indicate the state of the server at the time of initialization. If the evidence provided by the server is what that client expects, then the client can trust that the server has not been compromised. The server can similarly ensure that the client has not been compromised as a counter attestation of the client.

Many servers provide a trusted computing component ("TCC"), that is, hardware designed specifically to collect and maintain the evidence needed to support remote attestation. Many servers include a TCC that is a trusted platform module ("TPM") as specified by the Trusted Computing Group ("TCG"). The TCG is a consortium of hardware and software organizations that include Intel, AMD, Microsoft, and IBM. The TPM is a hardware component of a server that can securely record the state (e.g., code and data) of the server. The state may be associated with multiple layers of the software stack, including the firmware, BIOS, boot loader, hypervisor, and operating system. A server can provide to a client the measurement (or measurements) of the state (or states) as evidence of the server's state at initialization. The measurement may be a hash of the state. A client can compare a measurement received from a server to what the client knows is a "known-good" measurement of a known-good state. Based on the results of that comparison, the client can decide whether to request services of or otherwise interact with the server.

A TPM is a secure hardware processor that can perform cryptographic operations and store cryptographic keys or other values persistently. In current implementations, a TPM is a discrete chip that interfaces with the main central processing unit ("CPU") of a computer, but in future implementations the TPM may be integrated directly into the CPU. A TPM contains a set of fixed-size platform configuration registers ("PCRs") that store the resulting values of cryptographic one-way hashes of state information.

Once initialized, such as after a hardware reset, a TPM only allows a PCR to be "extended" by computing a cryptographic hash of its existing value (e.g., an initial value of zero) concatenated with an additional measurement M (i.e., PCR←hash(PCR, M)). The measurement M is typically a secure hash of state information generated by a Secure Hashing Algorithm ("SHA"), such as a SHA-256, generating a hash of a region of memory. After reset, initialization code (e.g., an authenticated code module) may set a PCR (e.g., PCR18) to a measurement that is the hash of certain computer code. For example, the initialization code may generate a value for PCR18 based on individual measurements (e.g., hashes) of several components, including the BIOS and other firmware, a measured launch environment ("MLE"), such as TBOOT, along with its command line, the operating system kernel, the kernel command line, and so on. The initialization code generates a hash of state information that is a measurement for the state of a component code and extends the value in the PCR with that hash. The initialization code then may pass control to that component to continue with measuring of other state information for another component, extending the PCR with the hash, and then passing control the other component. This process is repeated until the PCR is extended to reflect the measurements defined for that PCR. Since a PCR can be modified only via such extension operations, the TPM provides a means of storing secure measurements of state information, including code, data, configuration information, and so on. The TPM can also generate a digitally signed "TPM quote" that contains its PCR values (i.e., the measurements) together with a cryptographic signature. This allows a client to verify that the measurements were generated and protected by a valid TPM of the attesting server.

A sequence of extension operations on a single PCR is useful for representing a series of measurements compactly as a single, fixed-size hash value, computed as a chain of hashes. For example, a PCR may be initially set to a hash of the firmware, followed by extending the PCR by hashes of the BIOS, boot loader, hypervisor, and operating system in sequence. The result of such a series of measurements is referred to as a combined measurement. To verify that the set of measurements combined into a single PCR represents a known-good state, a client needs access to known-good combined measurements, referred to as a "whitelist," of known-good states. When a PCR value is constructed or generated by extending it with n individual constituent measurements $M_1, \ldots, M_n$ and each measurement $M_i$ has $G_i$ known-good states, the size of the resulting whitelist grows multiplicatively, with $G_1 \times \ldots \times G_n$ known-good states. Even modest values of n and $G_i$ can result in a very large number of known-good combined measurements that require large amounts of storage and/or significant computational resources to generate. As an example, in a typical data center, there may be a few known-good versions of TBOOT, many known-good TBOOT command-line options and parameters, dozens of known-good versions of OS kernels corresponding to different operating systems, builds, optimization levels, and configurations, and hundreds of known-good kernel command lines corresponding to different valid options and parameters. A whitelist for PCR18 for such a data center may contain many thousands or millions of possible known-good PCR18 values. For example, if $G_{TBOOT}=6$, $G_{TBOOTcmd}=10$, $G_{OS}=30$, and $G_{OScmd}=120$, the number of known-good values for the PCR18 whitelist would be $G_{TBOOT} \times G_{TBOOTcmd} \times G_{OS} \times G_{OScmd}=216,000$. In practice, the whitelist will continue to grow over time, as new versions of each component are released.

The maintenance of such a whitelist of known-good combined measurements in a large data center can be a challenge. When a new version of a component for a server is released, the whitelist needs to be updated and distributed to the clients. With such a release, a system administrator may need to manually load a known-good combined measurement for that version for every possible combination of versions of the other components. Continuing with the PCR18 example, if a new version of TBOOT is released, then the number of additional combinations would be $G_{TBOOTcmd} \times G_{OS} \times G_{OScmd}=36,000$. Because of the overhead needed to maintain such a whitelist, an organization may implement policies that limit the diversity of hardware and software supported by the data center.

DETAILED DESCRIPTION

Figure 1:
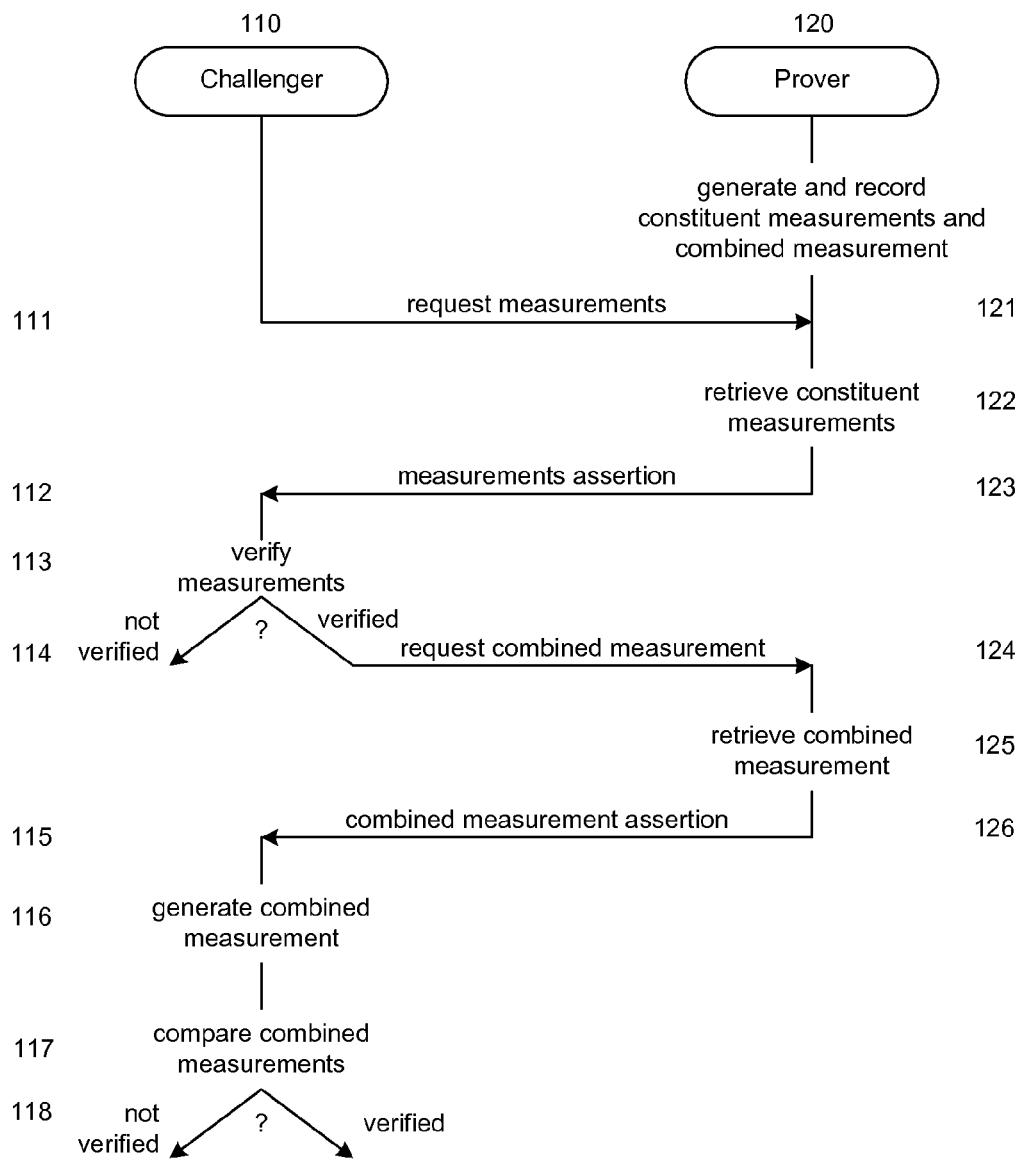
FIG. 1 is a flow diagram that illustrates the data flow between a challenger and a prover in some embodiments of the attestation system.

A method and system for asserting and verifying assertions of a known-good state of a computer system is provided. In some embodiments, an attestation system allows a challenger computer system ("challenger") and a prover computer system ("prover") to conduct an attestation so that the challenger can verify an assertion of the prover. To conduct the attestation, the prover sends as an assertion of its state a combined measurement of resources along with a constituent measurement of each resource to the challenger. For example, the resources may include a BIOS, a TBOOT, a TBOOT command line, an operating system kernel, and a kernel command line. The challenger verifies the assertion by verifying that the asserted constituent measurements represent known-good measurements and verifying that the asserted combined measurement can be generated from the asserted constituent measurements. The prover may send multiple combined measurements representing states of different sets of resources of the prover along with a set of constituent measurements for each combined measurement. In such a case, the challenger separately verifies each combined measurement. To verify the asserted constituent measurements, the challenger determines whether each asserted constituent measurement for a resource is a known-good measurement for that resource. For example, the challenger may maintain a whitelist for each resource that contains the known-good measurements for that resource. If each asserted constituent measurement for a resource is determined to be a known-good measurement for that resource (e.g., in the whitelist for that resource), then the asserted constituent measurements are verified. To verify the asserted combined measurement, the challenger generates a combined measurement from the asserted constituent measurements received from the prover. If the generated combined measurement is the same as the asserted combined measurement, then the asserted combined measurement is verified. The challenger does not need to compare the asserted combined measurement to a previously known-good combined measurement. Rather, the challenger dynamically generates a known-good combined measurement from the constituent measurements provided by the prover. If each asserted constituent measurement is verified and the asserted combined measurement is verified to match the generated combined measurement, then the assertion is verified. Since the challenger does not need to compare the asserted combined measurement to a known-good combined measurement, the challenger need not maintain a whitelist of known-good combined measurements and can avoid the overhead and complexity of maintaining a whitelist of all possible combined measurements and/or generating possible combined measurements from whitelists of measurements of resources.

In some embodiments, a prover employing the attestation system generates a combined measurement of its state as an assertion of its state. The prover may include a trusted platform component that stores a combined measurement that is generated from constituent measurements for resources of the prover that can be trusted as an assertion of a state of each of the resources. For example, the trusted platform component may be a trusted platform module with one or more PCRs for storing combined measurements. Each resource may have variations such as different versions of a MLE and different combinations of options of a kernel command line. A resource may be any software component (e.g., computer instructions), data structure, configuration data, hardware component, and so on that can have its state measured. The prover may generate a measurement for each resource using a hash algorithm, such as a SHA-256 hash, of that resource. The prover generates the combined measurement by using the measurements of the resources as constituent measurements of the combined measurement. The prover may generate the combined measurement as a hash chain of the measurements as the constituent measurements of the combined measurement. For example, such a combined measurement may be generated by a TPM at initialization of the prover by extending a PCR. The prover then sends to a challenger the combined measurement, which may be signed with a key of the TPM, and the constituent measurements as an assertion. The prover may also send to the challenger an indication of an algorithm used to generate the constituent measurement or the algorithm used to generate the combined measurement so that the challenger can use the same algorithm(s). The prover may also send to the challenger an indication of a variation (e.g., version number) of a software component that generates a constituent measurement. In some embodiments, the constituent measurements may be the same constituent measurements that are generated for use in generating the combined measurement. For example, each component that generates a constituent measurement when extending a combined measurement of a PCR may record its constituent measurement for sending to a challenger. Alternatively, the prover may separately generate the constituent measurements after the combined measurement is generated.

In some embodiments, a challenger employing the attestation system verifies an assertion of a prover that includes an asserted combined measurement and asserted constituent measurements. The challenger may initially send to a prover a request for an assertion of the constituent measurements of resources that the prover uses to generate a combined measurement of its resources. For example, if a challenger is a client that wants to request services of a server, the client sends to the server a request that the server provide an assertion of its constituent measurements. The challenger then receives from the prover an assertion that includes the constituent measurements. For each resource, the challenger may maintain a whitelist of known-good measurements for the resource. To verify the constituent measurements, the challenger determines whether the constituent measurement of each resource is in the whitelist for that resource. If the challenger determines that a constituent measurement for a resource is not in the whitelist for that resource, then the challenger cannot verify the constituent measurements. Without being able to verify the constituent measurements, the challenger cannot verify the assertion, may suppress further verification of the assertion, and may assume that the prover cannot be trusted. If the challenger determines that each constituent measurement for a resource is in the whitelist for that resource, then the challenger has verified the constituent measurements. The challenger also generates a combined measurement from the constituent measurements; such a combined measurement would be the same as that generated by the prover given the same constituent measurements. When the constituent measurements have been verified, the challenger sends to the prover a request for the combined measurement. When the challenger receives from the prover an assertion of the combined measurement, the challenger compares the asserted combined measurement to the combined measurement that it generated. If the combined measurements are the same, then the assertion of the prover has been verified, and the challenger may assume that the prover can be trusted. For example, when a client verifies the assertion of a server, the client may then request services of that server knowing that the server is trusted and has not been compromised.

In some embodiments, the attestation system allows a challenger performing remote attestation to determine whether a PCR represents a known-good combined measurement without having to store the whitelist of possible combined measurements. The attestation system allows the size of the whitelist that is to be stored for each PCR to be reduced from the multiplicative product of known-good measurements $G_1 \times \ldots \times G_n$ to a much smaller size that is the additive sum of known-good measurements $G_1 + \ldots + G_n$. Moreover, if it does not need to verify a constituent measurement for a certain resource of a prover, the attestation system need not store a whitelist for that resource. In such a case, a challenger can simply proceed assuming that the measurement for that resource is verified.

The attestation system also provides a challenger an opportunity to pre-calculate some or all of the known-good combined measurements. For example, a challenger may pre-calculate and store as a whitelist the pre-calculated combined measurements for typical configurations of servers. When a challenger receives an assertion from a server, the challenger can first check to see if the asserted combined measurement is in the whitelist. If in the whitelist, the challenger has verified the assertion and can avoid the overhead of verifying the constituent measurements and generating a combined measurement. If not in the whitelist, the challenger can proceed with verifying the constituent measurements and generating a combined measurement. A challenger can base a decision on how many known-good combined measurements to pre-calculate based on a desired tradeoff between storage requirements and verification speed. For example, a server that needs to frequently verify assertions of clients may decide that the overhead of storing a large whitelist is well worth the resulting reduced overhead of the verification process. In addition, when a challenger verifies that an asserted combined measurement matches a generated combined measurement, it may cache that combined measurement as a known-good combined measurement (e.g., adding to the whitelist) to avoid the overhead of verifying the constituent measurements and generating a combined measurement when the same asserted combined measurement is subsequently received. The attestation system can be used to avoid the manually intensive process of 1) installing various combinations of variations of resources on a computer system so that the computer system can generate a combined measurement for each possible combination and then 2) storing each generated combined measurement in a whitelist of combined measurements. Thus, even if a whitelist of combined measurements is to be used, the attestation system provides a more efficient way to generate that whitelist.

In some embodiments, the attestation system may further reduce the size of a whitelist of a resource by employing a representation that is more compact than storing each known-good measurement individually. For a given resource, a challenger may store known-good measurements for sub-resources of that resource. For example, if the resource is a software system, then the challenger may store a measurement for each module that makes up the software system. If a prover asserts a constituent measurement for a resource along with sub-constituent measurements for sub-resources of that resource, then a challenger can verify the asserted sub-constituent measurements of the sub-resources using the whitelists, generate a constituent measurement from the sub-constituent measurements, and verify whether the generated constituent measurement matches the asserted constituent measurement. This process of storing sub-resources of resources may be recursively applied to any level (e.g., sub-sub-resources of sub-resources of resources). In addition, the attestation system may store known-good measurements or other data associated with resources or sub-resources using compact patterns, such as regular expressions. In some embodiments, a prover may assert to a challenger raw data from which the challenger needs to generate a constituent measurement $M_i$.

The process of verifying asserted constituent measurements, generating a combined measurement from the asserted constituent measurements, and comparing the generated combined measurement to the asserted combined measurement to verify the assertion is referred to as "dynamic whitelisting." Dynamic whitelisting is achieved by effectively simulating the TPM PCR extension operation in software, using the individual measurements $M_i$ as inputs. Thus, in addition to a TPM quote containing signed PCR values, a prover also supplies the constituent measurements for all of the resources that were used to compute each PCR value. The prover may also provide metadata describing the constituent resources, such as version numbers. For some resources, such as a short command-line string, the prover may even include some or all of the raw data of a resource itself. The constituent measurements, metadata, and data are referred to collectively as assertions of the constituent measurements. A prover may also supply an identifier that specifies which measurement algorithm a TPM used for PCR extension to accommodate potential differences across diverse TPM implementations or generations. For example, TPM 1.2 uses the SHA-1 secure hash algorithm, while TPM 2.0 supports the SHA-256 algorithm, and some versions may even support downloading custom algorithms into the TPM processor.

A prover may also supply metadata that includes identifiers, such as component version numbers, to specify the particular algorithms used by the various software components to generate constituent measurements. The metadata may be used as inputs for TPM PCR extension because measurement algorithm details may vary across both components and component versions. As one example, TBOOT software measures both the kernel and the kernel command line. However, some versions of TBOOT make additional measurements, for example, the Launch Control Policy of the TPM's non-volatile memory. In general, component-specific measurement algorithms may use different hash functions, make different measurements, and permute the order in which measurements are performed. The prover may provide this metadata to a challenger to ensure that the challenger uses compatible algorithms when verifying the constituent measurements.

As an example of the computational savings of the attestation system, if a TPM of a prover employs hash chaining extensions of a fixed-length PCR value, the extensions will take the form SHA(current PCR value||new value). If there are n=10 resources and each of the 10 resources has on average G=5 known-good measurements, then there would be $G^n=5^{10}=9,765,625$ possible combined measurements in a typical whitelist of combined measurements. With the attestation system, however, only G×n=5×10=50 possible measurements need be stored using dynamic whitelisting in one embodiment. For example, if $G_{TBOOT}=6$, $G_{TBOOTcmd}=10$, $G_{OS}=30$, and $G_{OScmd}=120$, then storage for the whitelist would be reduced from $G_{TBOOT} \times G_{TBOOTcmd} \times G_{OS} \times G_{OScmd}=216,000$ to $G_{TBOOT}+G_{TBOOTcmd}+G_{OS}+G_{OScmd}=166$, which is a savings of more than 99.9%. In addition, the attestation system can provide the identification of the specific resource whose measurement could not be verified.

As described above, the attestation system can reduce the size of the whitelists of some resources by computing their measurements dynamically from sub-resource data or measurements. For example, the list of all $G_{OScmd}$ known-good measurements for the OS kernel command line may itself be large. In practice, the command line may even include data specific to a single physical server, for example, the "root=[Disk UUID]" parameter commonly used for booting Ubuntu Linux kernels. In such cases, the attestation system may ensure that the parameter is well-formed, for example, by pattern-matching using a regular expression to verify the measurement for the sub-resource. This approach to verification allows a challenger to compute the known-good measurement for a resource dynamically, using sub-resource data, such as portions of the command-line string, as inputs.

Once all of the constituent measurements have been verified, a challenger may compute the expected final PCR value, using the specified measurement algorithm. As one example, for PCR18, the challenger first verifies the TBOOT measurement. Based on the particular TBOOT measurement, the challenger determines which resource that specific version of TBOOT should measure next (such as the OS kernel), as well as the specific hash function that should be used to perform the measurement (such as SHA-1). The challenger then generates this measurement in software. This PCR computation approach yields the chained hash resulting from a series of simulated TPM extension operations of the form PCR←hash(PCR, $M_i$). If the dynamically computed PCR value matches the PCR value obtained using the TPM quote operation (i.e., the asserted combined measurement), then the assertion is verified. If it does not match, the assertion is not verified.

In some embodiments, the attestation system may use a modified remote-attestation protocol that allows various assertions such as the constituent measurements $M_i$ for resources or sub-resources measurement algorithm identifiers, resource or sub-resource data for generating measurements, or other auxiliary data. Alternatively, the attestation system may support sending such assertions out-of-band, for example, as a separate step, prior to the conventional attestation protocol. The attestation system does not need to require that such assertions be sent securely. If an assertion is modified (e.g., intentionally or inadvertently corrupted) in transit, then the dynamically computed combined measurement for a PCR value will not match the TPM quoted PCR value. A secure channel may nevertheless be needed to ensure that the confidentiality of any secret data is protected.

The attestation system simplifies whitelist generation because a system administrator need not collect TPM PCR values generated by a computer system having the known-good resources installed and load a combined measurement for each combination of known-good constituent measurements for each combination of known-good resources. Instead, the attestation system generates individual constituent measurements independently. The attestation system can generate these measurements using software that simulates the TPM PCR extension operations without the need for any hardware support that is specific to such operations.

The attestation system can efficiently allow the measurement of resources containing data that is unique to each individual prover. The use of such measurements in prior systems was generally not practical because unique data such as a random value could not have been captured in advance and measured into a PCR value. For example, a server may randomly generate a new public key to be used for secure, encrypted communication with clients. In this case, there is no known-good measurement for this key and thus no need for a client to maintain a whitelist of known-good measurements for this resource. Nevertheless, the client still can verify that the key provided by the server matches the key used to generate the PCR value. A client can accept any measurement of the key, as long as the PCR value generated by the client using the measurement of the key matches the asserted PCR value. In other words, if the client's dynamically computed PCR value, which includes a measurement of the asserted key, matches the TPM-quoted PCR value, then the client knows that the asserted key is correct.

FIG. 1 is a flow diagram that illustrates the data flow between a challenger and a prover in some embodiments of the attestation system. At initialization, the prover generates and records constituent measurements of resources and the combined measurement of the resources. The combined measurement may be recorded in a platform configuration register of a trusted platform module. A challenger 110 initiates the attestation process by sending 111 a request for measurements to a prover 120. Upon receiving 121 the request, the prover retrieves 122 the constituent measurements that were recorded at initialization. The prover then sends 123 the constituent measurements to the challenger as an assertion by the prover of the constituent measurements of the combined measurement. When the challenger receives 112 the assertion of the constituent measurements, the challenger verifies 113 the asserted constituent measurements by comparing the constituent measurements for each resource to known-good measurements for that resource. If the challenger verifies the constituent measurements, the challenger sends 114 a request for a combined measurement to the prover. Upon receiving 124 the request for the combined measurement, the prover retrieves 125 the combined measurement generated at initialization, for example, from a platform configuration register of a trusted platform module. The prover then sends 126 the combined measurement as an assertion to the challenger. Upon receiving 115 the assertion of the combined measurement, the challenger generates 116 a combined measurement from the asserted constituent measurements previously received and compares 117 the generated combined measurement to the asserted combined measurement. If the combined measurements match, then the challenger indicates 118 that the assertion is verified, else the challenger indicates that the assertion is not verified. In some embodiments, the challenger may send a single request for both the constituent measurements and the combined measurement, and the prover may send a single response that contains both, referred to as a single-step attestation. The sending of separate requests for the constituent measurements and for the combined measurement is referred to as a two-step attestation.

Figure 2:
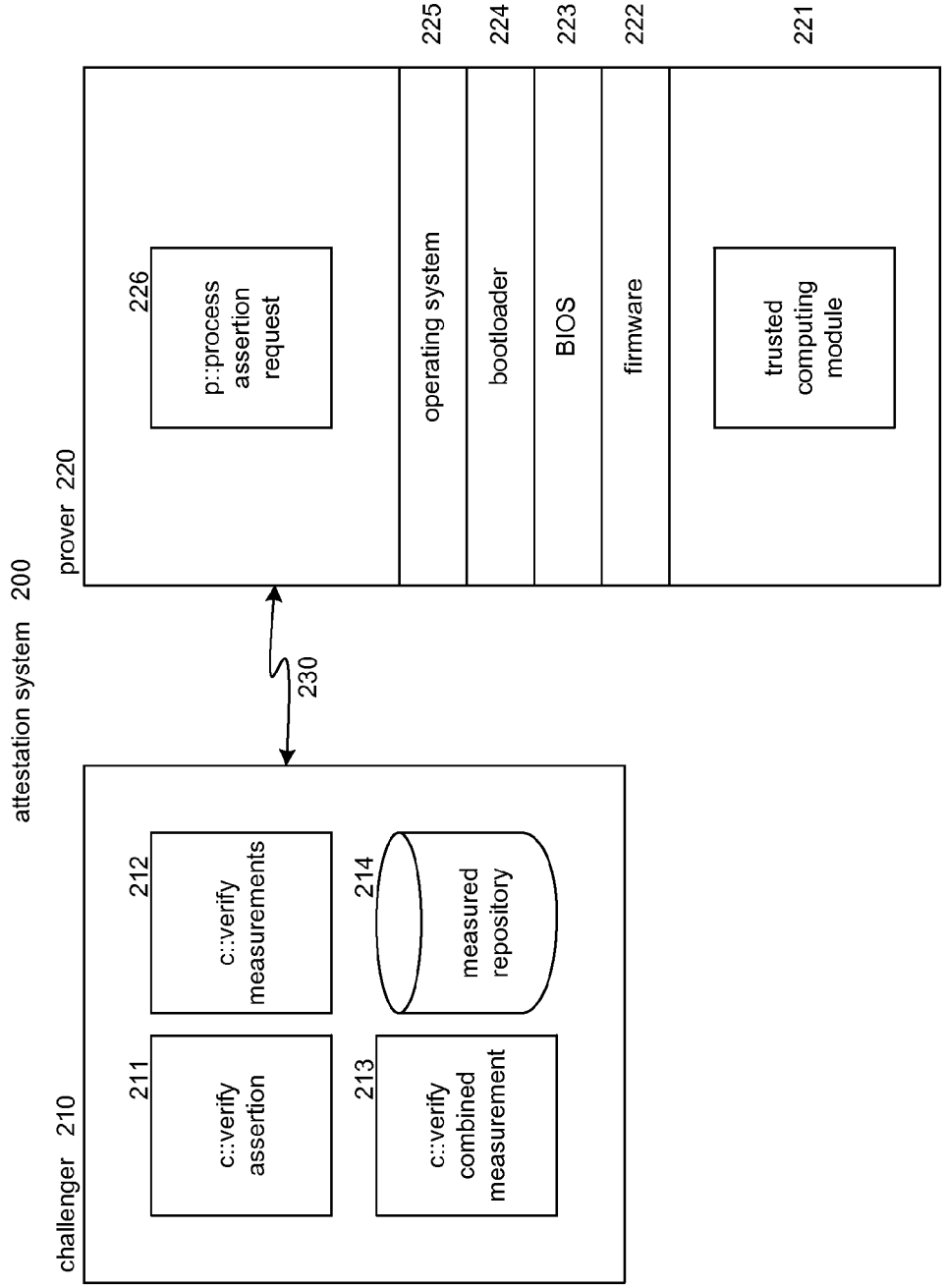
FIG. 2 is a block diagram that illustrates components of the attestation system in some embodiments.

FIG. 2 is a block diagram that illustrates components of the attestation system in some embodiments. The attestation system 200 includes components from a challenger 210 and a prover 220. The challenger includes a verify assertion component 211, a verify measurements component 212, a verify combined measurement component 213, and a measurement repository 214. The challenger invokes the verify assertion component to verify an assertion of the prover. The verify assertion component invokes the verify measurements component to verify the asserted constituent measurements and invokes the verify combined measurement component to verify the asserted combined measurement. The measurement repository 214 includes whitelists for various resources that indicate known-good measurements values for the resources. The prover includes a trusted computing module 221, firmware 222, a BIOS 223, a boot loader 224, an operating system 225, and a process assertion request component 226. The trusted computing module may include platform configuration registers for storing combined measurements of resources of the prover. The resources may include components of a software stack that includes the firmware, BIOS, boot loader, and operating system. The process assertion request component receives requests for assertions sent from a challenger via communication channel 230 and retrieves the constituent measurements of the combined measurement generated at initialization by extending a platform configuration register of the trusted computing module. At initialization, the prover may generate the constituent measurements and the combined measurement by an authenticated code module of the firmware generating a constituent measurement for the BIOS for extending a PCR. Control may then be passed to a module of the BIOS to generate a constituent measurement for next component of the software stack (e.g., the boot loader) for extending the PCR. This process continues up the software stack until the PCR has been extended to include all the measurements defined for that PCR. The process assertion request component sends the combined measurement and the constituent measurements as an assertion to the challenger. In some embodiments, the constituent measurements may be provided by a computer system other than the prover. For example, such a computer system may maintain the constituent measurement for each resource of a prover. Whenever the configuration of a prover changes, the computer system may update the constituent measurements. In this way, existing servers need not be modified to support attestation using dynamic whitelisting. Also, when a server initializes, it may provide its asserted combined measurement to a computer system for distribution to challengers. Alternatively, the computer system may verify the asserted combined measurement and notify clients whether the server can be trusted. In such a case, the computer system is considered to be the challenger.

The computing devices (i.e., computer systems) on which the attestation system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, trusted platform modules, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the attestation system. The data transmission media is used for transmitting data via transitory, propagating signals or carrier waves (e.g., electromagnetism) via a wired or wireless connection.

The attestation system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the attestation system may be implemented in hardware using, for example, an application-specific integrated circuit ("ASIC").

Figure 3:
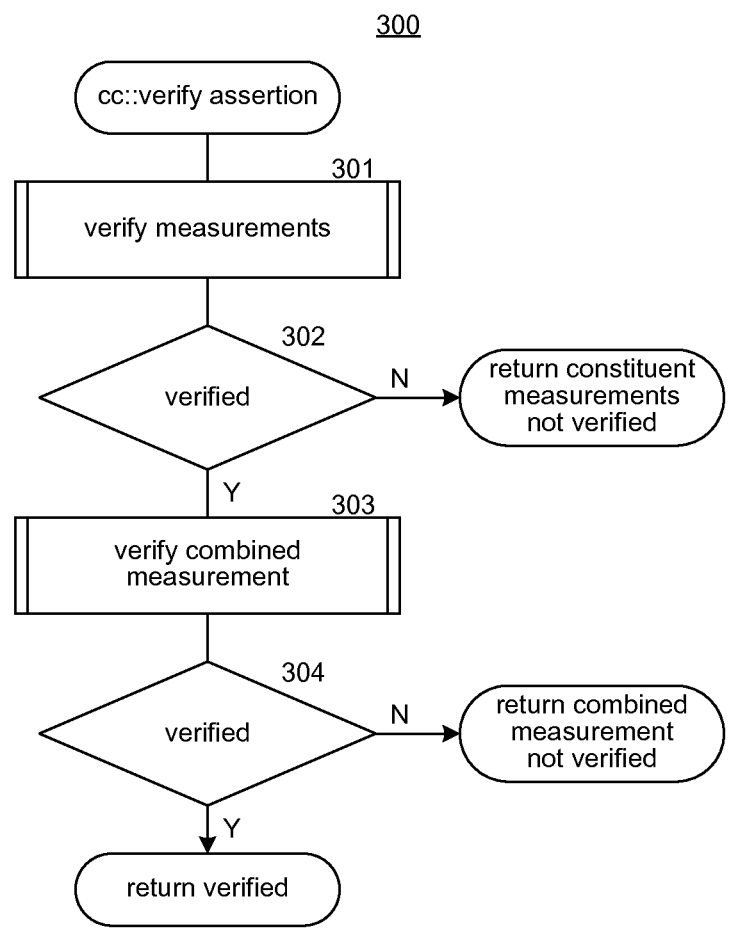
FIG. 3 is a flow diagram that illustrates the processing of a verify assertion component of a challenger in some embodiments.

FIG. 3 is a flow diagram that illustrates the processing of a verify assertion component of a challenger in some embodiments. The verify assertion component 300 receives an assertion provided by a prover that includes a combined measurement and constituent measurements and determines whether the assertion can be verified. In block 301, the component invokes the verify measurements component to verify the asserted constituent measurements. In decision block 302, if the asserted constituent measurements can be verified, then the component continues at block 303, else the component returns an indication that the asserted constituent measurements cannot be verified. In block 303, the component invokes a verify combined measurement component to verify the asserted combined measurement. In decision block 304, if the asserted combined measurement can be verified, then the component returns an indication that the assertion is verified, else the component returns an indication that the asserted combined measurement cannot verified to match the generated combined measurement.

Figure 4:
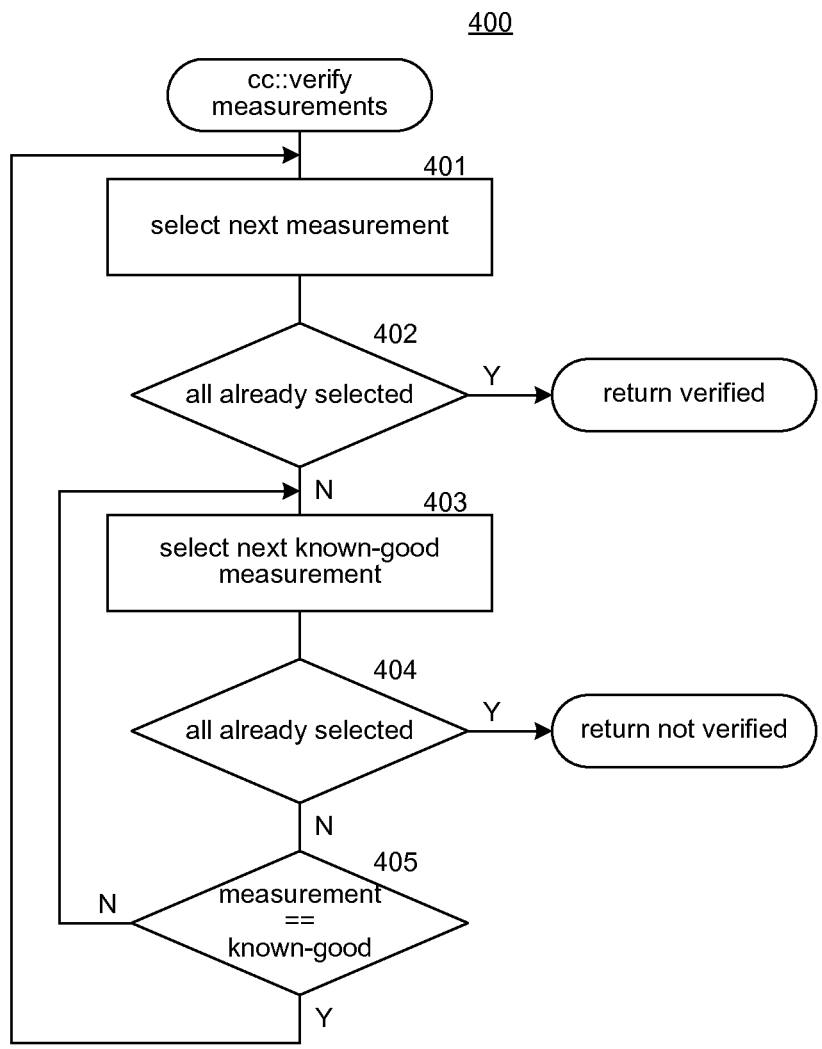
FIG. 4 is a flow diagram that illustrates the processing of a verify measurements component of a challenger in some embodiments.

FIG. 4 is a flow diagram that illustrates the processing of a verify measurements component of a challenger in some embodiments. The verify measurements component 400 is provided asserted constituent measurements and verifies whether all the asserted constituent measurements are known-good measurements. In block 401, the component selects the next asserted constituent measurement. In decision block 402, if all the asserted constituent measurements have already been selected, then the component returns an indication that the asserted constituent measurements have been verified, else the component continues at block 403. In block 403, the component selects the next known-good measurement for the resource of the selected asserted constituent measurement. In decision block 404, if all such known-good measurements have already been selected, then no known-good measurement has been found for the selected asserted constituent measurement and the component returns an indication that the asserted constituent measurements are not verified, else the component continues at block 405. In decision block 405, if the selected asserted constituent measurement matches the selected known-good measurement, then the selected asserted constituent measurement has been verified and the component loops to block 401 to select the next asserted constituent measurement, else the component loops to block 403 to select the next known-good measurement for the resource of the selected asserted constituent measurement.

Figure 5:
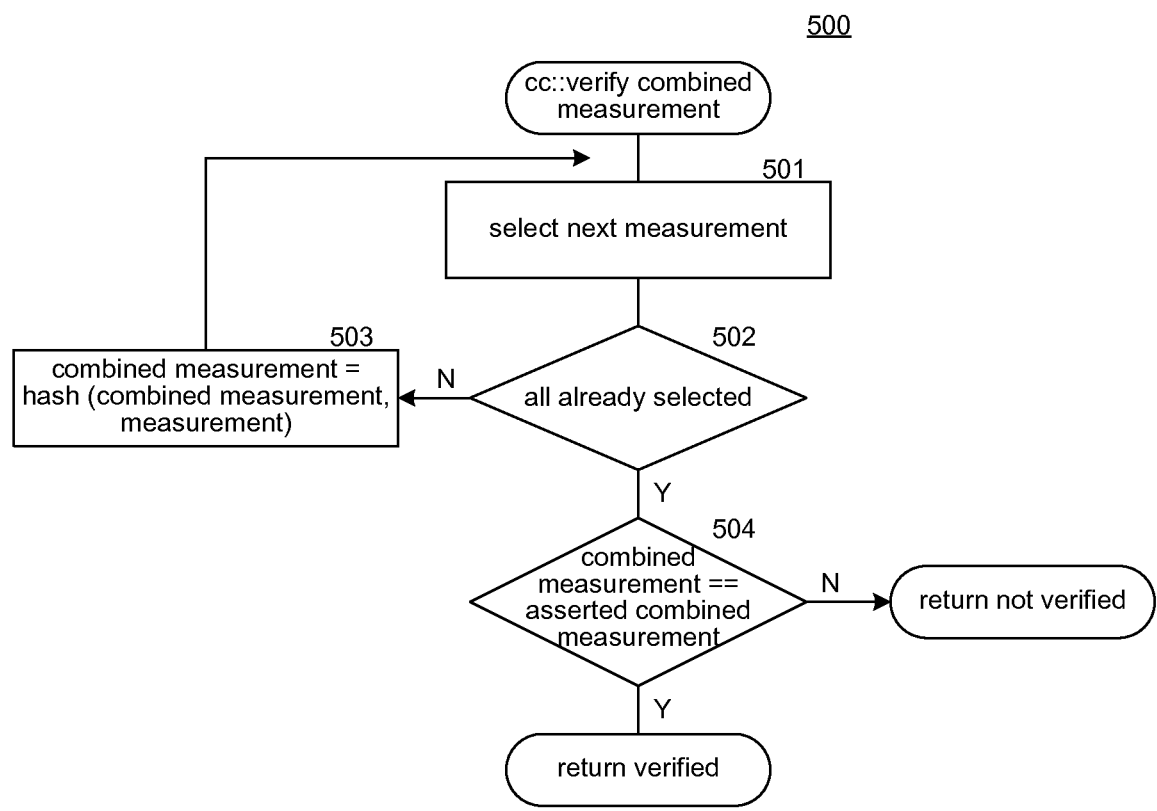
FIG. 5 is a flow diagram that illustrates the processing of a verify combined measurement component of a challenger in some embodiments.

FIG. 5 is a flow diagram that illustrates the processing of a verify combined measurement component of a challenger in some embodiments. The verify combined measurement component 500 receives an asserted combined measurement and asserted constituent measurements and verifies whether a combined measurement generated from the asserted constituent measurements matches the asserted combined measurement. In block 501, the component selects the next asserted constituent measurement. In decision block 502, if all the asserted constituent measurements have already been selected, then the component continues at block 504, else the component continues at block 503. In block 503, the component generates the combined measurement by hashing the previously generated combined measurement with the selected asserted constituent measurement and then loops to block 501 to select the next asserted constituent measurement. In decision block 504, if the generated combined measurement matches the asserted combined measurement, then the component returns an indication that the assertion has been verified, else the component returns an indication that the assertion has not been verified. In some embodiments, the component may cache a combined measurement for an assertion that has been verified in a cached whitelist of combined measurements and use that cached whitelist to verify a subsequent assertion of that combined measurement without having to regenerate that combined measurement. The attestation system may also be used to pre-calculate a whitelist of combined measurements. To pre-calculate a whitelist, the attestation system may perform the processing of blocks 501-503 for each possible combination of constituent measurements and store the combined measurements in the whitelist. The whitelist can be provided to a challenger to verify assertions without having to regenerate combined measurements.

Figure 6:
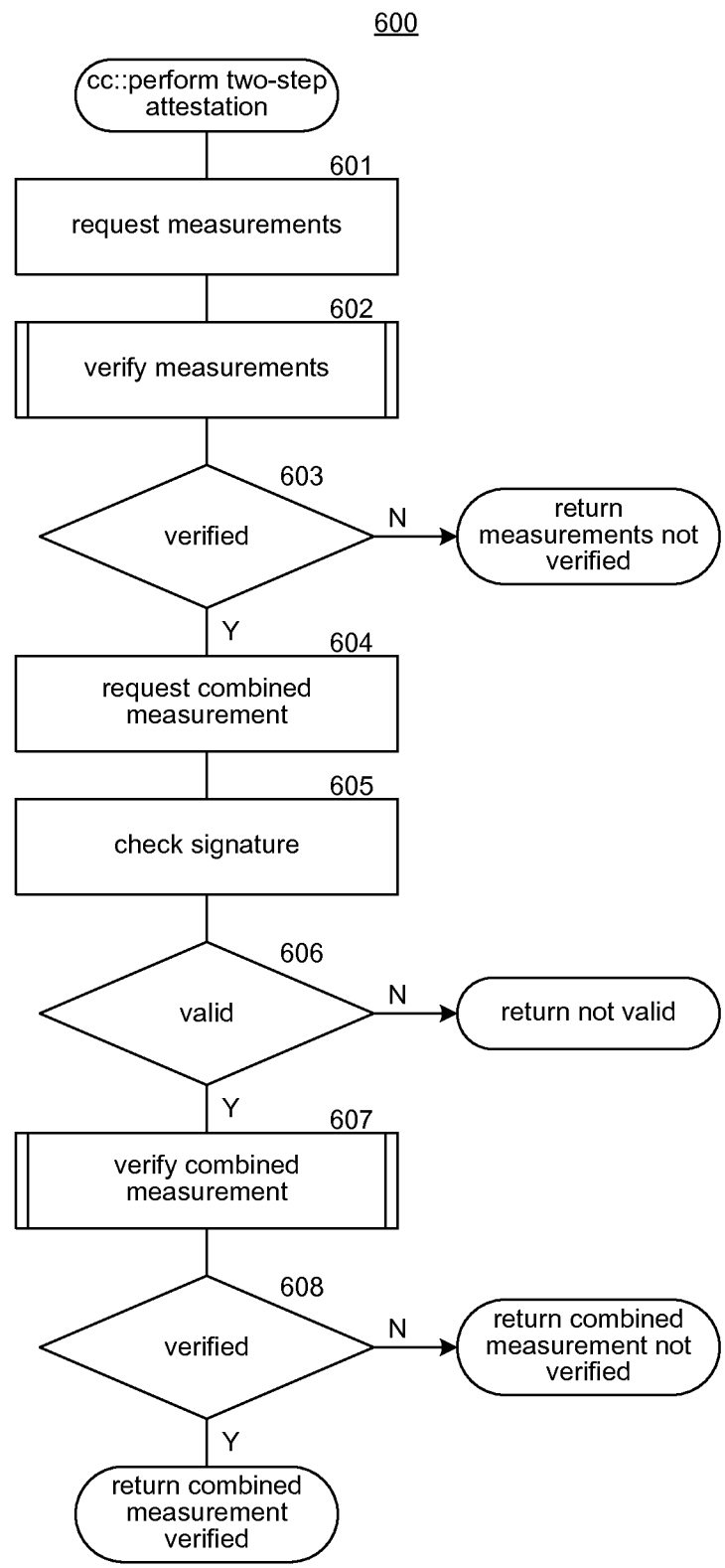
FIG. 6 is a flow diagram that illustrates the processing of a perform two-step attestation component of a challenger in some embodiments.

FIG. 6 is a flow diagram that illustrates the processing of a perform two-step attestation component of a challenger in some embodiments. The perform two-step attestation component 600 is invoked by a challenger to perform a two-step attestation process that includes first requesting a prover to provide asserted constituent measurements and verifying the asserted constituent measurements and then requesting the prover to provide an asserted combined measurement and verifying the asserted combined measurement. In block 601, the component sends a request for the constituent measurements. In block 602, after receiving the assertion of the constituent measurements for the prover, the component invokes a verify measurements component to verify the asserted constituent measurements. In decision block 603, if the asserted measurements are verified, then the component continues at block 604, else the component returns an indication that the asserted constituent measurements have not been verified. In block 604, the component sends to the prover a request for a combined measurement. In block 605, after receiving the assertion of the combined measurement, the component checks the signature of the asserted combined measurement to ensure that it was signed by the prover. For example, the prover may sign the asserted combined measurement with a private key and the challenger may use the corresponding public key to check the signature. In decision block 606, if the signature is valid, then the component continues at block 607, else the component returns an indication that the signature is not valid. In block 607, the component invokes the verify combined measurement component to verify the asserted combined measurement. In decision block 608, if the asserted combined measurement is verified, then the component returns an indication that the asserted combined measurement has been verified, else the component returns an indication that the asserted combined measurement has not been verified.

Figure 7:
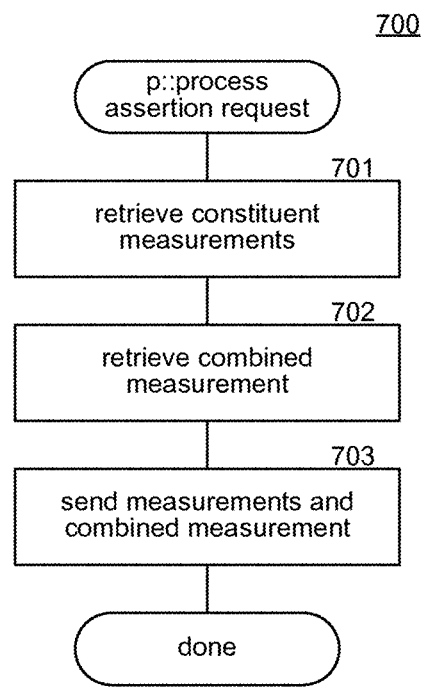
FIG. 7 is a block diagram that illustrates a process assertion request component of a prover in some embodiments.

FIG. 7 is a block diagram that illustrates components of a process assertion request of a prover in some embodiments. The process assertion request component 700 is provided a request for an assertion sent by a challenger and generates and sends the corresponding assertion. In block 701, the component retrieves the constituent measurements of the combined measurement. In block 702, the component retrieves the combined measurement, for example, from a platform configuration register of a trusted computing module. The combined measurement may be signed by the trusted computing module. In block 703, the component sends the constituent measurements and the combined measurement as an assertion to the challenger and then completes.

From the foregoing, it will be appreciated that specific embodiments of the invention have been described herein for purposes of illustration, but that various modifications may be made without deviating from the scope of the invention. As one example, in some embodiments, the attestation system may make policy decisions based on "blacklists" of "known-bad" measurements of malware, instead of whitelists of known-good measurements of valid resources. For each resource, however, the number of known-bad measurements will often be much larger than the number of known-good measurements. As a result, in existing systems, the storage requirements for blacklists for combined measurements would be even larger than for whitelists. The attestation system may allow blacklists to be employed to identify bad resources (e.g., malware) using resource-specific blacklists to avoid the high storage requirements and without needing to perform the complete PCR computation. In some embodiments, the attestation system may use a combination of both whitelists and blacklists or may use rules or algorithms to classify computer systems based on asserted measurements. Accordingly, the invention is not limited except as by the appended claims.

The invention claimed is:

1. A method performed by a challenger computer system ("challenger") to verify an assertion of a prover computer system ("prover"), the method comprising:
receiving from the prover an assertion asserting a combined measurement of constituent measurements of resources and a constituent measurement for each of the resources;
checking whether a list of known-good combined measurements includes the asserted combined measurement;
in response to the list including the asserted combined measurement, indicating that the assertion is verified; and
in response to the list not including the asserted combined measurement,
for each of the asserted constituent measurements of resources, determining whether that constituent measurement matches a known-good constituent measurement for the corresponding resource;
generating a combined measurement from the asserted constituent measurements;
determining whether the asserted combined measurement matches the generated combined measurement; and
in response to each constituent measurement matching a known-good measurement and the asserted combined measurement matches the generated combined measurement, indicating that the assertion is verified; and
adding the asserted combined measurement to the list to avoid the overhead of verifying the asserted constituent measurements and generating a combined measurement when the same asserted combined measurement is subsequently received.

2. The method of claim 1 wherein the asserted combined measurement is a value from a platform configuration register of the prover.

3. The method of claim 1 wherein the generated combined measurement is generated as a chain of hashes of asserted constituent measurements.

4. The method of claim 1 wherein the asserted combined measurement is generated by a trusted computing platform of a computing system of the prover.

5. The method of claim 4 wherein the asserted combined measurement is a value from a platform configuration register of the trusted computing platform.

6. The method of claim 1 wherein the resources include software components of the prover.

7. The method of claim 1, further comprising, when an asserted constituent measurement does not match a known-good measurement, indicating that the assertion is not verified.

8. The method of claim 7, further comprising, when an asserted constituent measurement does not match a known-good measurement, suppressing the generating of the combined measurement.

9. The method of claim 1 wherein the challenger and prover are computer systems.

10. A prover computer system ("prover") comprising:
a trusted platform component for storing a combined measurement, in a list of known-good combined measurements, that is generated from constituent measurements for resources of the prover that can be trusted as representing the resources;
a storage medium storing computer-executable instructions that send to a challenger computer system ("challenger") the combined measurement and the constituent measurements as assertions of the prover so that the challenger can check whether the asserted combined measurement is a known-good combined measurement by checking whether the list includes the asserted combined measurement, and in response to the list not including the asserted combined measurement, for each of the asserted constituent measurements of resources, determining whether that constituent measurement matches a known-good constituent measurement for the corresponding resource; generating a combined measurement from the asserted constituent measurements; determining whether the asserted combined measurement matches the generated combined measurements; and in response to each constituent measurement matches a known-good measurement and the asserted combined measurement matches the generated combined measurement, indicating that the assertion is verified; and adding the asserted combined measurement to the list to avoid the overhead of verifying the asserted constituent measurements and generating a combined measurement when the same asserted combined measurement is subsequently received; and
a processor for executing the computer-executable instructions stored in the storage medium.

11. The prover of claim 10 wherein the computer-executable instructions further send to the challenger an indication of an algorithm used to generate a constituent measurement.

12. The prover of claim 10 wherein the computer-executable instructions further send to the challenger a version number associated with a software component that generates a constituent measurement.

13. The prover of claim 10 wherein the resources include computer instructions and configuration information.

14. The prover of claim 10 wherein the resources include a measured launch environment and an operating system kernel.

15. The prover of claim 10 wherein the trusted platform component generates the combined measurement using a hash chaining of the constituent measurements.

16. The prover of claim 10 wherein the computer-executable instructions further generate a constituent measurement independently of the trusted platform component.

17. A computer-readable storage medium storing computer-executable instructions for controlling a challenger computer system ("challenger") to verify an assertion of a prover computer system ("prover"), the computer-executable instructions comprising instructions that:
receive the assertion of the prover asserting a combined measurement of constituent measurements of resources of the prover generated by a trusted platform module of the prover and, for at least some of the resources, asserting constituent measurements for the resources;
determining whether a list of known-good combined measurements includes the asserted combined measurement;
in response to the list including the asserted combined measurement, indicating that the assertion is verified; and in response to the list not including the asserted combined measurement for each of the asserted constituent measurements of the resources, determining whether the constituent measurement matches a known-good constituent measurement for the corresponding resource; generating a combined measurement from the asserted constituent measurements; determining whether the asserted combined measurement matches the generated combined measurement; and in response to each of the asserted constituent measurements matching a known-good constituent measurement and the asserted combined measurement matching a combined measurement generated from the asserted constituent measurements, indicating that the assertion is verified, and that the asserted combined measurement is a known-good combined measurement, and adding the asserted combined measurement to the list to avoid the overhead of verifying the asserted constituent measurements and generating a combined measurement when the same asserted combined measurement is subsequently received.

18. The computer-readable storage medium of claim 17 wherein the asserted constituent measurements are output by the trusted platform module.

19. The computer-readable storage medium of claim 17 wherein the asserted constituent measurements are generated by software of the prover that is not part of the trusted platform module.

20. The computer-readable storage medium of claim 17, further comprising instructions that generate a known-good measurement for a resource from sub-constituent measurements of sub-resources of the resource asserted by the prover.

* * * * *